(12) United States Patent
Husney

(10) Patent No.: US 8,847,783 B2
(45) Date of Patent: Sep. 30, 2014

(54) HIGH SPEED UTILITY BACKHAUL COMMUNICATION SYSTEM

(75) Inventor: Jordan Husney, Minneapolis, MN (US)

(73) Assignee: Digi International Inc., Minnetonka, MN (US)

( * ) Notice: Subject to any disclaimer, the term of this patent is extended or adjusted under 35 U.S.C. 154(b) by 182 days.

(21) Appl. No.: 12/869,951

(22) Filed: Aug. 27, 2010

(65) Prior Publication Data

US 2012/0050064 A1   Mar. 1, 2012

(51) Int. Cl.
*G08B 23/00* (2006.01)
*H04L 12/28* (2006.01)

(52) U.S. Cl.
CPC .................. *H04L 12/2827* (2013.01)
USPC .................................... 340/870.02

(58) Field of Classification Search
USPC ................. 340/870.02, 870.03; 705/412
See application file for complete search history.

(56) References Cited

U.S. PATENT DOCUMENTS

| | | | |
|---|---|---|---|
| 2002/0040355 A1* | 4/2002 | Weiner | 705/412 |
| 2005/0012639 A1* | 1/2005 | Smit | 340/870.02 |
| 2006/0031180 A1* | 2/2006 | Tamarkin et al. | 705/412 |
| 2011/0046798 A1* | 2/2011 | Imes et al. | 700/286 |
| 2011/0202293 A1* | 8/2011 | Kobraei et al. | 702/62 |

* cited by examiner

*Primary Examiner* — Joseph Chang
*Assistant Examiner* — Jeffrey Shin
(74) *Attorney, Agent, or Firm* — Fogg & Powers LLC

(57) ABSTRACT

A local area utility network includes a utility, a low-speed backhaul between the utility and a utility provider, and a high-speed broadband network interface module in the utility coupling the utility directly to a broadband network. A plurality of utilities is coupled via a wireless mesh home area utility network. The low-bandwidth backhaul is operable to communicate at least one of billing, pricing, and load control events to a utility provider, and the high-speed broadband network connection to a home automation system.

21 Claims, 2 Drawing Sheets

HIGH SPEED UTILITY BACKHAUL COMMUNICATION SYSTEM

FIELD OF THE INVENTION

The invention relates generally to utility communication, and more specifically in one embodiment to a high-speed utility backhaul system.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

The Bluetooth technology that enables a cell phone user to associate and use an earpiece in what is sometimes referred to a personal area network or PAN. Similarly, the familiar WiFi or Ethernet connections routed throughout many homes today are often referred to as a home area network. These networks are often linked to broader networks, such as a cellular telephone network or the Internet, to provide various services to the local area networks. Other types of network have similar structures, but are used for special purposes such as control or communication with specific devices or applications.

One such example is home networks designed in conjunction with "Smart Energy" or "Smart Grid" initiatives, in which devices in the home such as thermostats, water heaters, air conditioning, and other utilities are monitored or controlled via a network connection. A network link or backhaul between a utility service such as an electric power meter and a utility company provides the utility company with access to metering data. In addition, a high speed network connection often provides communication for other devices or services, such as being able to manage or control appliances or devices coupled to the utility service. For example, a power meter backhaul may be used to communicate power use and billing information to the utility, while a high-speed backhaul may be used to time cycle air conditioning in times of high demand to manage the demands made on the electric power grid.

The utility backhaul or network link is often built directly into the power meter, and typically provides limited data communication such as billing information. The utility meter can therefore use low-speed service such as cellular telephone networks or a neighborhood mesh network to communicate power use or billing data back to the utility company. Other communications, such as appliance or utility control signals used in the home area network, are communicated via a high-speed link such as a local broadband network provided via WiFi, cable modem, DSL, or other such technologies.

It is therefore desirable to manage network connectivity among the various devices in a home network.

SUMMARY

A local area utility network includes a utility, a low-speed backhaul between the utility and a utility provider, and a high-speed broadband network interface module in the utility coupling the utility directly to a broadband network. In further examples, a plurality of utilities is coupled via a wireless mesh home area utility network. The low-bandwidth backhaul is operable to communicate at least one of billing, pricing, and load control events to a utility provider, and the high-speed broadband network connection to a home automation system.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Many homes include multiple links to outside networks, including consumer communication devices such as cellular telephones, land line telephones, broadband Internet via DSL or cable modem, as well as special-purpose networks such as networked utility meters, digital cable television, and home security systems. Utilities are increasingly linked to a "smart grid" or "smart energy" system, in which information such as billing or consumption information is relayed to the utility provider automatically via a network rather than manually collected by a meter reader. For example, a water or electric utility might use a meter operable to call a central office via a cellular telephone network periodically to report utility usage, reducing the cost of meter reading and enabling better monitoring and characterization of utility usage and demand.

Figure 1:
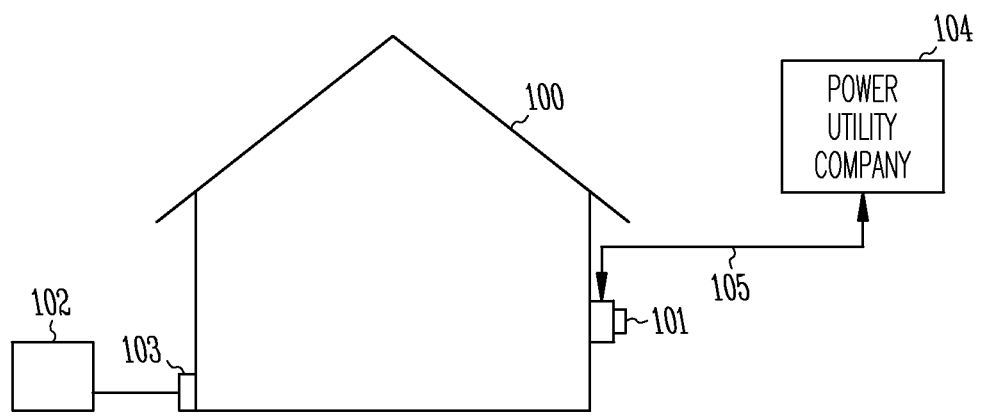
FIG. 1 shows a home utility infrastructure, consistent with the prior art.

One example of such a system is illustrated in FIG. 1, which shows a home utility infrastructure consistent with the prior art. Here, a home 100 includes a power service entry 101, which has a low bandwidth backhaul link 105 to the power utility company 104 to provide power usage information. In a more detailed embodiment, the backhaul 105 uses a cellular data network or neighborhood mesh network to communicate with the power utility 104.

An air conditioner 102 is further coupled to a networked power management module 103, which is operable to communicate with the power utility either via its own low data rate backhaul connection, or is operable to communicate with the utility company via a wireless network connection to the low data rate backhaul 105 provided in power meter 101. This enables sending information to the air conditioner power management module such as load control events that may result in limited or timed operation of the air conditioner 103 to better distribute and manage the power load on the utility company at peak times.

Home area networks also often include additional utility network connections, including high capacity backhaul links used for services such as home automation and energy management systems. For example, a home or building employing an energy management system can have its lighting, heat, air conditioning, and ventilation systems controlled by a remote computer. A homeowner might control their lighting and HVAC system remotely while at work or on vacation, or a power utility might control times at which air conditioning is use during periods of peak demand. In larger buildings such as commercial facilities, central computer control might regulate when lighting is turned on and off, and change temperature or other HVAC settings at different times of day and during weekends.

Figure 2:
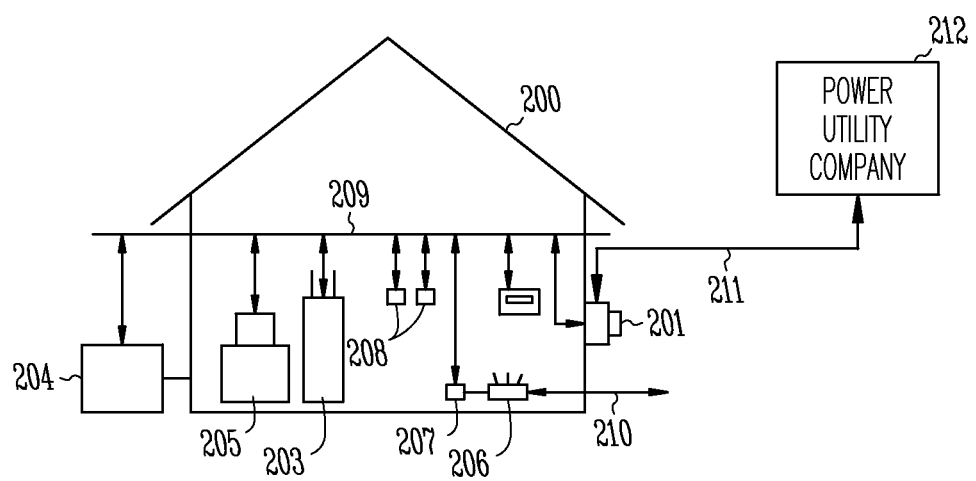
FIG. 2 shows a home utility infrastructure including a home area utility network, consistent with the prior art.

A home area network of devices such as utilities are therefore often linked to a high-speed network for control, such as a home's existing broadband network provided through DSL or a cable modem. An example of such a system is shown in FIG. 2, which illustrates a home utility infrastructure comprising high bandwidth and low bandwidth backhaul network connections. Here, a house 200 or other building is supplied power through a power meter 201, which includes a low bandwidth connection 211 to the utility company 212 much like the power meter of FIG. 1, used to exchange information such as power usage, pricing, and load control events. The low bandwidth connection is further coupled to various appliances within the home via a network such as a wireless mesh network 209, including thermostat 202, water heater 203, air conditioner 204, and heat/ventilation system 205. The low data rate connection in the power meter is operable to send data to the utility company, such as power use information, and to receive information from the utility company, such as load control event information and pricing information. A mesh network module within the power meter is further operable to communicate with the appliances, such as the water heater 203 and air conditioner 204, and to control their operation in times of high power usage.

A high speed broadband connection 206 is provided by the homeowner, such as by providing a DSL, cable, wireless, or fiber Internet connection to broadband network 210. Here, the home broadband router 206 is coupled to a bridge or gateway 207 that links the home broadband network to the mesh network linking the various appliances to one another. In a more detailed embodiment, the gateway device 207 communicates with a paired mesh network device placed in the power meter 201, which provides a secure connection between the home appliance network and the user's broadband network to protect the appliances within the home from unauthorized tampering via the mesh network. Additional mesh network appliance controls such as light controls 208 are also coupled to the home area mesh network 209.

In operation, a user such as a homeowner or building superintendent is able to manage the appliances via the broadband network 210, such as to turn the air conditioning or heat up or down, ensure that lights are on or off, turn the hot water heater temperature up or down, or perform other such functions via the Internet by using the bridge 207 coupled to a bridge or gateway device to the home's mesh appliance network via the power meter. Appliances within the network are also operable to send data via the Internet that would be too large or time consuming to send via a low-backhaul network, such as real-time power consumption to enable profiling of a home's power usage for use in predicting energy use or to provide guidance on saving energy. Home automation functions, such as appliance and light control via the Internet also enable a homeowner to perform tasks such as ensuring that appliances are set low when the house isn't in use, and restoring the appliance settings before the homeowners return home.

But, associating the bridge or gateway device 207 with the mesh network interface in the power meter to provide secure and authenticated access to the home's mesh utility network from the Internet involves significant configuration. The gateway device 207 must be securely associated with the mesh network interface in the power meter 201, such as by configuring a shared encryption key, to ensure that outside entities cannot join the network and change utility operation.

Figure 3:
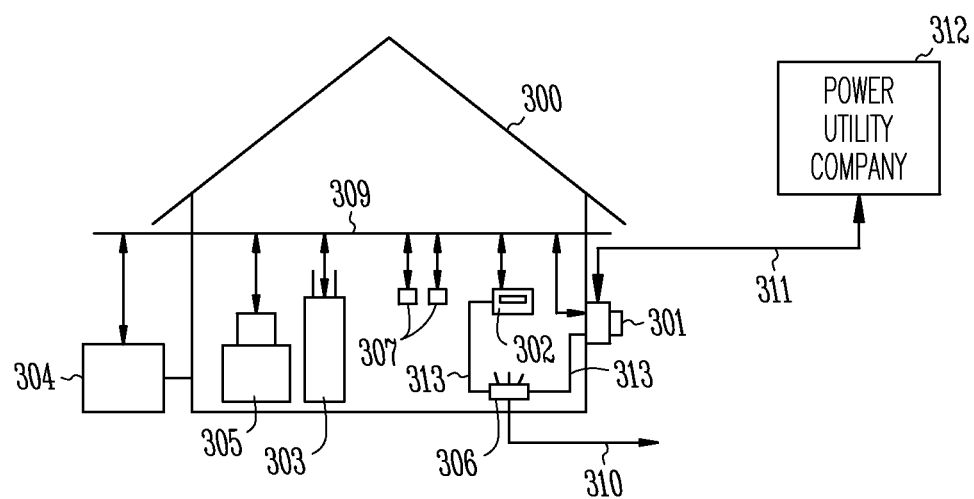
FIG. 3 shows a home utility infrastructure including a bridge module within a utility directly coupled to a network, consistent with an example embodiment of the invention.

One example embodiment of the invention therefore provides an improved high bandwidth link for a home area utility network, incorporating a broadband connection within a utility appliance within the home or building, eliminating the need to connect and configure a standalone gateway communications device 207. FIG. 3 shows an example home area network, consistent with an example embodiment of the invention.

Building 300 is in this example a house 300 has a power meter 301, which includes a low bandwidth connection 311 to the utility company 312 much like the power meter 201 of FIG. 2. This low bandwidth backhaul connection 311 is used to exchange low bandwidth or infrequent information such as power usage, pricing, and load control events. The low bandwidth connection is again coupled to various appliances within the home via a network such as a wireless mesh network 309, including thermostat 302, water heater 303, air conditioner 304, and heat/ventilation system 305. A mesh network module within the power meter is operable to communicate with the appliances, such as the water heater 303 and air conditioner 304, and to control their operation in times of high power usage.

A high speed broadband connection 306 is again provided by the homeowner, such as by providing a DSL, cable, wireless, or fiber Internet connection. Here, the home broadband router 306 is coupled directly to an existing element of the home area utility network 313, such as via an Ethernet link to thermostat 302 or power meter 301. In other embodiments, the high-speed home network is coupled to the home area utility network by a wireless link such as WiFi, or by using an alternate wired or wireless technology supported by the home broadband network. In both these examples, the module in power meter 301 or thermostat 302 is directly connected to a device having an Internet connection, no longer requiring an intermediate device such as gateway device 207 to communicate with the home area utility network.

This eliminates the step of installing and configuring a bridge device 207, and reduces the number of components and complexity of the user's home broadband system. When using a direct network connection such as Ethernet, no additional configuration need be performed to couple the home area utility network to the building's broadband network, as such networks are typically configured to automatically add new devices found on a direct wired network such as by using a DHCP server to assign an IP address. When a wireless link couples a home area utility network device to the broadband network, a variety of configuration options are available, including use of a shared key, use of WiFi Protected Setup (WPS), or other automatic configuration tools. Some configuration options such as WPS do not require manual entry of long keys, but instead rely on a pin number or actuation of setup buttons on the respective devices near in time. Use of USB to carry configuration information, or simple recognition by proximity also provide automated WiFi configuration in further examples, including security when desired.

The homeowner is therefore able to manage the appliances via the broadband network 310 using the direct link between the home's broadband network and a home area utility networked device, such as the thermostat 302 or power meter 301 shown in FIG. 3. Various Internet-enabled applications are therefore able to address the home's networked utilities, such as to turn the air conditioning or heat up or down, ensure that lights are on or off, turn the hot water heater temperature up or down, or perform other such functions. Appliances within the network are again operable to send data via the Internet that would be too large or time consuming to send via a low-backhaul network, such as real-time power consumption to enable profiling of a home's power usage for use in predicting energy use or to provide guidance on saving energy.

Internet-enabled applications can therefore be used on a computer, smart phone, or other device to control home automation functions, including the utilities such as water heater 303's temperature, air conditioner 304 and HVAC system 305's settings, and lights 307. This allows a homeowner or building superintendent to control appliances, lights, and utilities from a timed computer program, from a secure website via a web browser, or via an Internet-enabled smart phone.

Smart energy technologies such as the examples described herein also enable a homeowner or building superintendent to better understand and manage energy use within the building. High bandwidth communication between the utilities and a computerized system provide for real-time monitoring, recording, and control of energy use. Water, gas, and electricity use can all be better characterized and understood, and opportunities for resource savings can be identified. This not only reduces the utility cost to the homeowner, but decreases the demands placed upon the utility infrastructure and our natural resources.

Homeowners can also observe utility consumption and cost in real-time rather than simply receiving an aggregated bill many weeks after using a utility, allowing the homeowner to observe and react to his consumption habits. Further, pricing changes or periods of utility rationing such as are increasingly common in load control events can be viewed in real time, enabling a consumer to make an informed decision as to controlling utility use during times of peak consumption. Management of utilities across multiple facilities, such as multiple buildings under management, multiple corporate locations, or vacation homes can also be integrated into management tools. Utilities can similarly use data from multiple locations to better ensure adequate resource delivery and reliability.

Using computerized monitoring of utilities via a home area network, consumers can more readily plan and budget utility bills, observing historic use, difference between typical and current use, and the impact that circumstances such as unusually cold or hot weather are having on utility consumption. More complex calculations, such as predictive resource use based on anticipated weather or other conditions, calculation of one's "carbon footprint", and other such management of resource use are further made possible by integration of high-capacity broadband into a home area utility network.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A local area utility network, comprising:
a local network;
at least one utility meter connected to the local network;
a low-speed backhaul between the utility meter and a utility provider; and
at least one high-speed broadband network interface module providing control of at least one utility, coupled through the local network to a broadband network;
wherein the utility meter includes a gateway and a low-speed backhaul interface, wherein the gateway is connected between the local network and the low-speed backhaul interface, wherein the gateway transfers data from the low-speed backhaul interface through the local network to the at least one high-speed broadband network interface module, from the at least one high-speed broadband network interface module through the local network to the low-speed backhaul interface and from the utility meter through the local network to the broadband network.

2. The local area utility network of claim 1, wherein the high-speed broadband network interface module comprises at least one of an Ethernet network interface and a WiFi network interface.

3. The local area utility network of claim 1, wherein the utility comprises at least one of an air conditioner, a water heater, a ventilation system, a heat system, and lighting.

4. The local area utility network of claim 1, wherein the at least one-utility meter comprises at least one of a water meter, a gas meter, and an electric power meter.

5. The local area utility network of claim 1, wherein the low-speed backhaul is operable to communicate at least one of billing, pricing, and load control events.

6. The local area utility network of claim 1, wherein a plurality of utilities are coupled via a wireless mesh home area utility network.

7. The local area utility network of claim 1, wherein one or more of the utilities are coupled via high-speed broadband network connection to a home automation system.

8. A method of communicating in a local area utility network, comprising:
sending high bandwidth data via at least one high-speed broadband network interface module providing control of at least one utility, coupled through a local network to a broadband network;
sending low bandwidth data via a low-speed backhaul between at least one utility meter and a utility provider where in the low-speed backhaul is a low-speed communications channel between the utility provider and the meter, wherein the channel is not part of the broadband network.

9. The method of communicating in a local area utility network of claim 8, wherein the high-speed broadband network interface module comprises at least one of an Ethernet network interface and a WiFi network interface.

10. The method of communicating in a local area utility network of claim 8, wherein at least one utility connected to the local area utility network comprises at least one of an air conditioner, a water heater, a ventilation system, a heat system, and lighting.

11. The method of communicating in a local area utility network of claim 8, wherein the at least one utility meter comprises at least one of a water meter, a gas meter, and an electric power meter.

12. The method of communicating in a local area utility network of claim 8, wherein the low-speed backhaul is operable to communicate at least one of billing, pricing, and load control events.

13. The method of communicating in a local area utility network of claim 8, wherein a plurality of utilities are coupled via a wireless mesh home area utility network.

14. The method of communicating in a local area utility network of claim 8, wherein one or more of the utilities are coupled via high-speed broadband network connection to a home automation system.

15. A building utility, comprising:
a low-speed backhaul interface for transferring data between a utility meter and a utility provider on a low-speed communications channel connecting the utility meter to the utility provider;
at least one high-speed broadband network interface module providing control of a utility coupled through a local network to a broadband network; and
a gateway connected between the backhaul interface and the at least one high-speed broadband network interface module, wherein the gateway transfers data from the backhaul interface to the utility meter, from the utility meter through the low-speed backhaul interface to a utility provider and from the utility meter through the broadband network to the at least one high-speed broadband network interface module;
wherein the low-speed backhaul is a low-speed communications channel between the utility provider and the utility meter that is separate from the broadband network.

16. The building utility of claim 1, wherein the high-speed broadband network interface module comprises at least one of an Ethernet network interface and a WiFi network interface.

17. The building utility of claim 1, wherein the utility comprises at least one of an air conditioner, a water heater, a ventilation system, a heat system, and lighting.

18. The building utility of claim 1, wherein the utility meter comprises at least one of a water meter, a gas meter, and an electric power meter.

19. The building utility of claim 1, wherein the utility is coupled to at least one other utility via a wireless mesh home area utility network.

20. The building utility of claim 1, wherein the utility is coupled via the high-speed broadband network connection to a home automation system.

21. A utility meter, comprising:
a processor, wherein the processor determines utility usage;
a backhaul interface connected to the processor, wherein the backhaul interface, when connected over a backhaul to a utility provider, is operable to communicate at least one of billing, pricing, and load control events from a utility provider;
a mesh network interface connected to the processor, wherein the mesh network interface is operable to communicate with appliances within range of the utility meter;
at least one broadband network interface module providing control of the utility and connected to the processor, wherein the broadband network interface module is operable to communicate information from the processor to the utility provider across a broadband network; and
a gateway connected between the backhaul interface and the mesh network interface and between the mesh network interface and the broadband network interface module, wherein the gateway transfers data from the backhaul interface through the mesh network to the utilities, from the utilities through the mesh network and the low-speed backhaul interface to the utility provider and from the processor through the broadband network interface module and the broadband network to the utility provider.

* * * * *